(12) United States Patent
Anderegg et al.

(10) Patent No.: US 11,574,449 B1
(45) Date of Patent: Feb. 7, 2023

(54) METHODS AND SYSTEMS FOR OFF-DEVICE IMAGE FRAME RENDERING IN AUGMENTED REALITY APPLICATIONS

(71) Applicant: Verizon Patent and Licensing Inc., Basking Ridge, NJ (US)

(72) Inventors: Bradley G. Anderegg, Glen Gardner, NJ (US); Marvin Marmol, Leander, TX (US); James Susinno, Wellesley, MA (US); Matthew Walter Mitman, Bowman, SC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/471,565

(22) Filed: Sep. 10, 2021

(51) Int. Cl.
*G06T 19/00* (2011.01)
*G06T 7/30* (2017.01)
*G06T 7/50* (2017.01)
*G06V 20/10* (2022.01)

(52) U.S. Cl.
CPC ............. *G06T 19/006* (2013.01); *G06T 7/30* (2017.01); *G06T 7/50* (2017.01); *G06V 20/10* (2022.01)

(58) Field of Classification Search
CPC ........... G06T 19/006; G06T 7/30; G06T 7/50; G06V 20/10
See application file for complete search history.

(56) References Cited

U.S. PATENT DOCUMENTS

| 6,016,150 A * | 1/2000 | Lengyel | G06T 11/001 345/589 |
|---|---|---|---|
| 10,395,427 B1 * | 8/2019 | Côté | G06V 20/20 |
| 10,885,701 B1 * | 1/2021 | Patel | A63F 13/57 |
| 2021/0027415 A1 * | 1/2021 | Khalid | H04L 67/1008 |

* cited by examiner

*Primary Examiner* — Chong Wu

(57) ABSTRACT

An illustrative image rendering system separate from and communicatively coupled to a presentation device detects a pre-modeled scene within a captured frame received from the presentation device. The pre-modeled scene is associated with a model asset accessible to the image rendering system. Based on the captured frame and the model asset, the image rendering system generates an augmentable representation of the pre-modeled scene and, based on the augmentable representation, generates an augmented version of the captured frame. The generating of the augmented version of the captured frame includes a plurality of render passes each configured to simulate a different virtualized element of a plurality of virtualized elements augmenting the pre-modeled scene within the augmented version of the captured frame. The image rendering system provides the augmented version of the captured frame to the presentation device. Corresponding methods and systems are also disclosed.

20 Claims, 11 Drawing Sheets

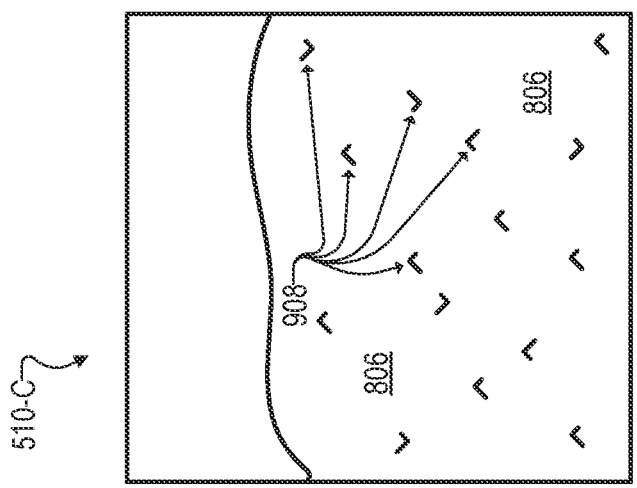
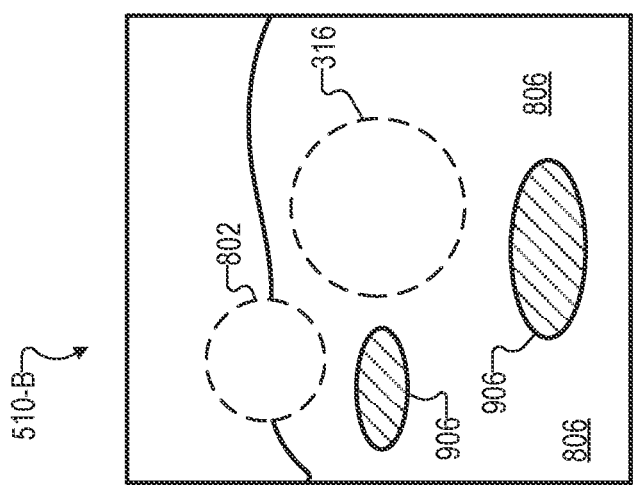
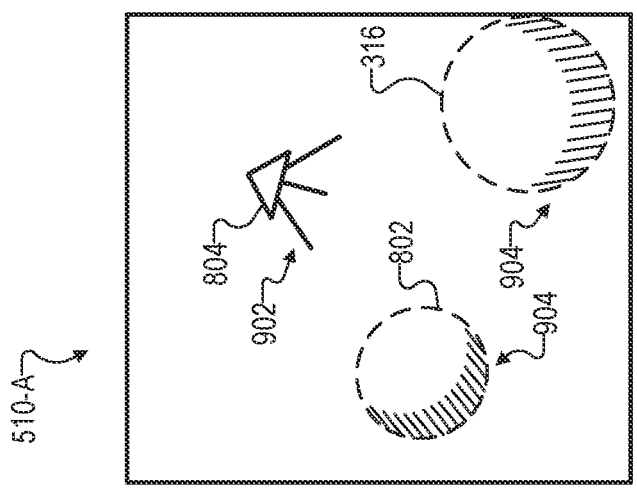

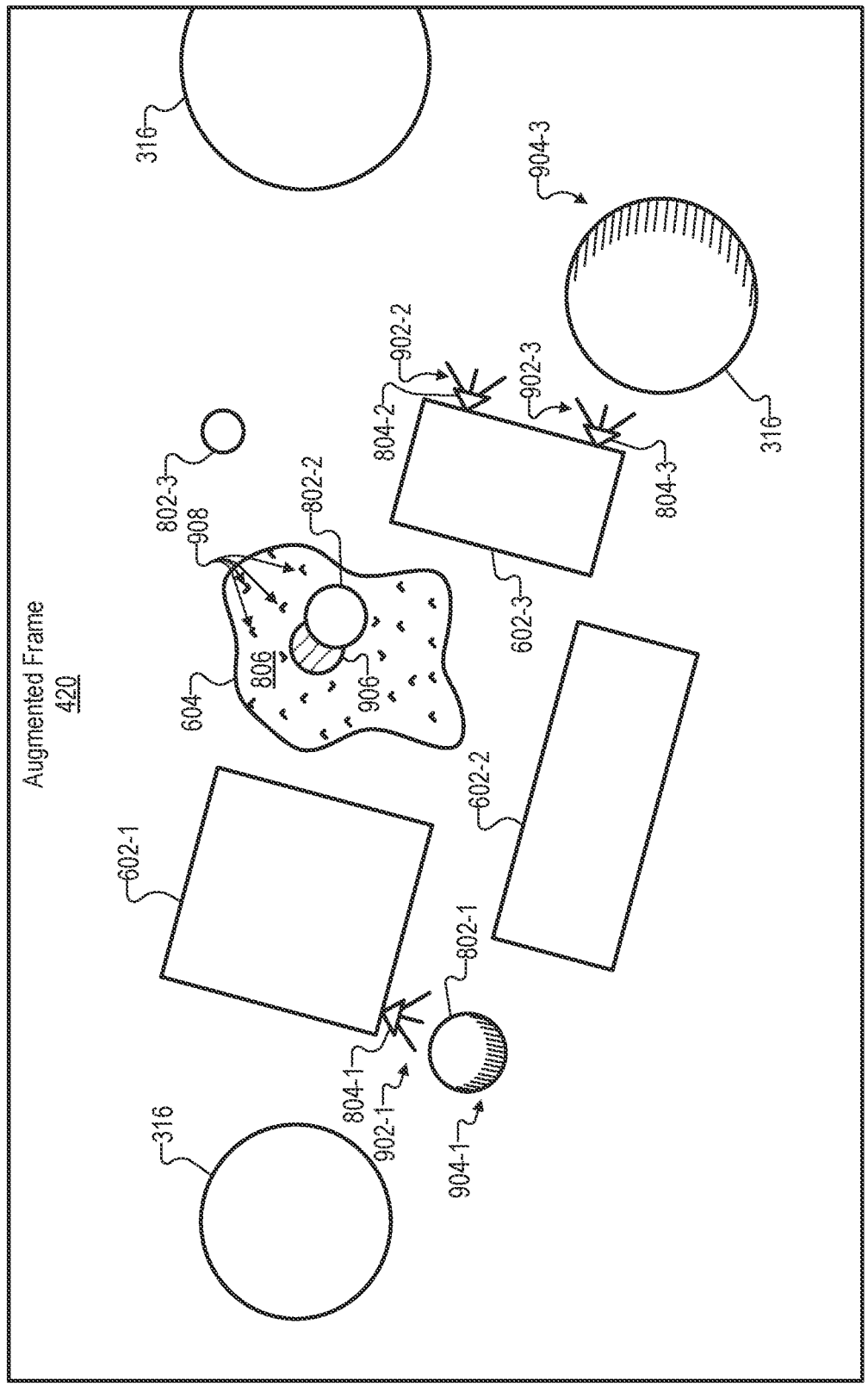

METHODS AND SYSTEMS FOR OFF-DEVICE IMAGE FRAME RENDERING IN AUGMENTED REALITY APPLICATIONS

BACKGROUND INFORMATION

Various types of extended reality technologies are being developed, deployed, and used by users to engage in various types of extended reality experiences. As one example, augmented reality technologies (also referred to as mixed reality technologies) provide augmented reality experiences whereby users continue to experience the real world around them to at least some extent (e.g., seeing real objects in their environment by way of a partially transparent heads-up display, video passed through from a head-mounted camera, etc.) while also being presented with virtual elements and augmentations that do not exist in the real world. For instance, virtual characters and other virtual objects may be presented as part of an augmented reality game or other entertainment application, virtual instructions or other information may be presented as part of an augmented reality educational application, virtual schematics or datasheets may be presented as part of an augmented reality occupational support application (e.g., to support a welder on a manufacturing floor, a car mechanic in a repair shop, etc.), or the like.

In certain augmented reality applications, it is desirable for virtualized elements to be presented in a manner that accurately and efficiently accounts for real-world elements of the scene within which the augmented reality experience is presented. However, various challenges must be overcome to identify and account for real-world elements, as well as to render high-quality augmented reality content in an efficient and timely manner (e.g., in real-time as the augmented reality experience is ongoing).

BRIEF DESCRIPTION OF THE DRAWINGS

The accompanying drawings illustrate various implementations and are a part of the specification. The illustrated implementations are merely examples and do not limit the scope of the disclosure. Throughout the drawings, identical or similar reference numbers designate identical or similar elements.

FIGS. 9A-9C show illustrative aspects of potential render passes that may be performed as part of generating an augmented version of the capture frame of FIG. 7 according to embodiments described herein.

FIG. 10 shows an illustrative augmented version of the captured frame of FIG. 7 according to embodiments described herein.

DETAILED DESCRIPTION OF EXAMPLE EMBODIMENTS

Figure 1:
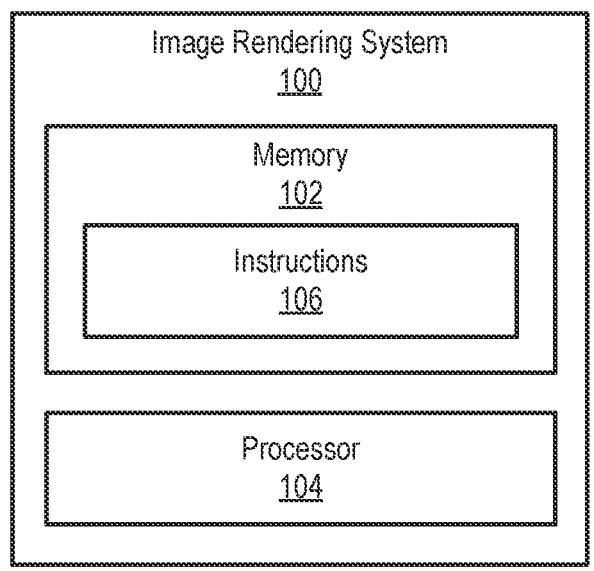
FIG. 1 shows an illustrative image rendering system for off-device image frame rendering in augmented reality (AR) applications according to embodiments described herein.

Methods and systems for off-device image frame rendering in augmented reality (AR) applications are described herein. In contrast with AR applications, virtual reality (VR) applications involve fully virtualized worlds in which every object can be precisely modeled and controlled in accordance with the available resources of a system providing the VR experience. For example, a VR experience that allows a user to move through a 3D space may comprise light sources and surfaces (e.g., surfaces of virtual 3D objects) that are all fully modeled and under explicit control of the system. As such, raytracing and other advanced graphical techniques may be performed to simulate light propagation to an arbitrarily accurate extent, allowing for extremely high-quality and photorealistic images of the virtual world to be rendered and presented during the VR experience. While the same degree of photorealism may be desirable for experiences presented using AR technologies, various challenges arise in this context that do not necessarily arise for the fully virtual worlds of VR applications. For example, AR environments may include certain virtual light sources and surfaces that are fully modeled and controlled by an AR provider system while also including real-world light sources, objects, and surfaces that are not modeled by the system or under the system's control (due to being real elements rather than virtual ones). Such real elements must interact realistically with the virtualized elements if a convincingly immersive AR environment is to be provided.

Unique challenges arising when integrating real-world and virtualized elements into a single AR presentation may be especially difficult to address in real time (e.g., as a user experiences a real-world scene that is to be augmented). Immense processing power greater than may be practical for any particular presentation device may be brought to bear on these challenges, yet, in order to achieve real-time performance goals, this processing may be required to be made available with minimal latency. For instance, a presentation device (e.g., an AR presentation device) may capture 30 frames per second at a real-world scene such that providing an AR experience based on this data capture requires augmenting 30 frames every second to include virtualized elements that appear to interact with real elements in various ways. Among other virtualized elements, augmented frames may each depict not only virtual objects that are not actually present in the real world, but also virtual surfaces that are affected by real-world light sources (e.g., depicting shadows cast by real objects, casting virtual shadows onto real and virtual surfaces, etc.), real surfaces that are affected by virtual light sources, complex surfaces that produce reflections of real and/or virtual objects (e.g., metallic surfaces, water surfaces, etc.), and dynamic specular textures (e.g., glittering water, snow, etc.).

Rendering such virtualized elements presents significant processing challenges, especially given the real-time demands inherent to many AR experiences (e.g., an expectation that augmentation of the world is to be processed in a manner that seems instantaneous to the user as he or she looks around the real world using an AR presentation device). Accordingly, methods and systems described herein offload much or all of the processing work (e.g., of analyzing and recognizing real-world elements, of generating virtualized elements, of rendering imagery that integrates the real and the virtual together to form immersive and photorealistic imagery, etc.) onto multi-access servers separate from the AR presentation devices capturing the image frames and being used by the users. For example, as will be described in more detail below, multi-access edge compute (MEC) systems may be ideally suited for such "off-device" image frame rendering due to extremely low latency that these systems can provide, while cloud-based computing systems may also be used for certain tasks and/or in certain implementations due to cost and computational efficiencies and computing capabilities these systems can provide.

As will be described in more detail herein, an off-device (e.g., server-based) AR rendering pipeline may be provided that performs server-side augmentation and rendering for display on an AR presentation device serving as a mobile thin client. The AR presentation device may initiate a request to a server system (e.g., a MEC system, a cloud-based multi-access server, etc.) and, once accepted, may begin uploading camera frames (e.g., at 30 frames per second or another suitable rate) to the server system. The server system may perform computer vision and augmentation on the image, and may quickly send back a fully rendered frame which can be presented by the AR presentation device. By building on the processing power of server systems, and the low latency of MEC systems in particular, more realistic and higher fidelity detail may be provided in these AR images than what may otherwise be possible with on-device AR rendering (i.e., rendering performed by the AR presentation device itself) or with other conventional approaches. For example, by combining capture and photogrammetry with real-time vision, image rendering systems described herein may create mesh details of the real world for use within virtual simulations. These details bring new life to AR experiences such as by allowing interaction and/or collision with the real-world environment, such as by implementing virtual lights that shine onto real world surfaces, showing accurate shadowing of virtual objects based on real world lighting, producing reflections of virtual objects over real or virtual reflective surfaces (e.g., mirrors, bodies of water, etc.), and so forth.

As will be described and illustrated in more detail below, pre-modeled scenes may be created and used by methods and systems for off-device image frame rendering. For example, pre-modeled scenes may correspond to scenes (e.g., including specific objects, surfaces, etc.) that an AR presentation device can be anticipated to encounter during an AR experience, and may be associated with preconfigured datasets referred to herein as "model assets" that define what virtual objects and/or light sources are to be integrated with the pre-modeled scene, what materials are to be simulated for the pre-modeled scene, how real and virtual elements associated with the pre-modeled scene are to interact, and so forth. When a pre-modeled scene is encountered during an AR experience, pre-generated depth maps and other properties of the pre-modeled scene may be accessed as part of a model asset associated with the pre-modeled scene, and this data of the model asset may be employed to help efficiently and accurately render augmented frames depicting the pre-modeled scene in various ways described in more detail below.

Various specific implementations will now be described in detail with reference to the figures. It will be understood that the specific implementations described below are provided as non-limiting examples of how various novel and inventive principles may be applied in various situations. Additionally, it will be understood that other examples not explicitly described herein may also be captured by the scope of the claims set forth below. Methods and systems for off-device image frame rendering in augmented reality applications may provide any of the benefits mentioned above, as well as various additional and/or alternative benefits that will be described and/or made apparent below.

FIG. 1 shows an illustrative image rendering system 100 ("system 100") for off-device image frame rendering in augmented reality applications in accordance with principles described herein. System 100 may be implemented by computer resources such as processors, memory facilities, storage facilities, communication interfaces, and so forth. While conventional frame rendering systems may be partially or fully implemented within AR presentation devices themselves (e.g., user equipment (UE) devices, head-mounted or hand-held extended reality presentation devices, mobile devices such as smartphones or tablet devices, personal computers, or other equipment used directly by end users), system 100 may perform off-device image frame rendering by being implemented by multi-access computing systems separate from the AR presentation devices being used to capture and present image frames during the AR experience. For example, system 100 may be partially or fully implemented by distributed computing systems operated by a cellular data provider (e.g., multi-access edge compute (MEC) systems), distributed computing systems operated by a cloud-computing provider (e.g., multi-access cloud compute systems), or other suitable server-side computing systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with off-device image frame rendering in augmented reality applications according to methods and systems described herein and/or as may serve a particular implementation.

Figure 2:
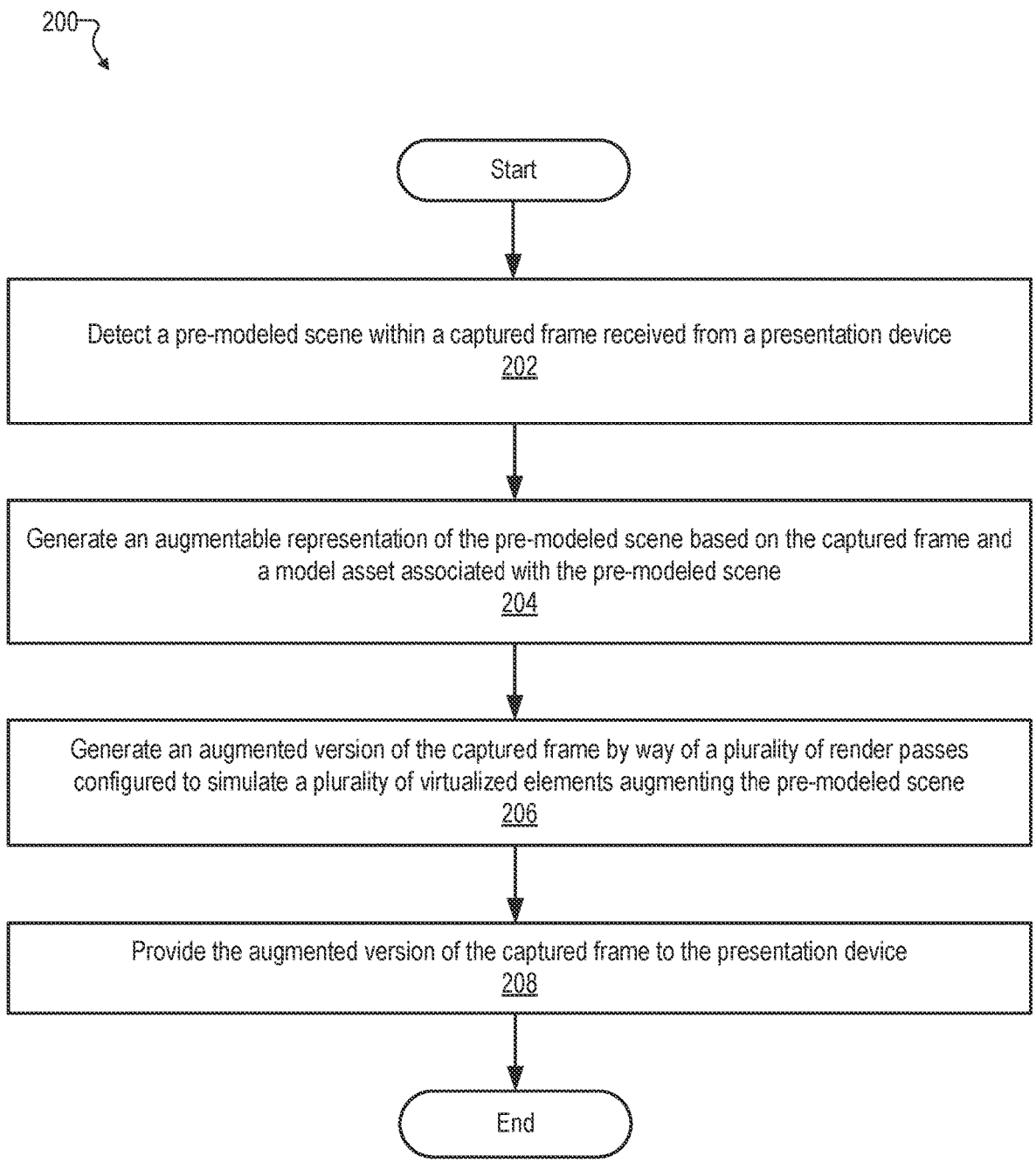
FIG. 2 shows an illustrative method for off-device image frame rendering in AR applications according to embodiments described herein.

As one example of functionality that processor 104 may perform, FIG. 2 shows an illustrative method 200 for off-device image frame rendering in augmented reality applications in accordance with principles described herein. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an image rendering system such as system 100 and/or any implementation thereof.

In some examples, the operations of FIG. 2 may be performed in real time so as to provide, receive, process, and/or use data described herein immediately as the data is generated, updated, changed, exchanged, or otherwise becomes available. Moreover, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-208 of method 200 will now be described in more detail as the operations may be performed by an implementation of system 100 (e.g., by processor 104 executing instructions 106 stored in memory 102) that is separate from and communicatively coupled to an AR presentation device.

At operation 202, system 100 may detect a pre-modeled scene within a captured frame received from the AR presentation device. For example, as will be described in more detail below, the pre-modeled scene may be implemented as a physical model of a real or imaginary world such as a tabletop village, a model train set, a model of a castle or fantasy landscape, a model constructed from a kit of plastic bricks or other construction materials, or another such physical model (e.g., which may be available in connection with an AR application). The pre-modeled scene may be configured to be augmented, during an AR experience, with virtualized elements such as virtual light sources (e.g., lighted windows, streetlights, campfires, torches, etc.), virtual characters (e.g., villager characters, flying dragons and other fantasy characters, etc.), and/or other virtual objects (e.g., train steam, clouds or fog, a virtual body of water, objects that the virtual characters interact with, etc.). In other examples, pre-modeled scenes may be implemented as a full room or other such real-world space. For instance, a particular room in a user's office or home, a classroom in which a virtual instructor (e.g., a well-known public figure, etc.) presents AR-enhanced education content, or other such rooms or spaces may be pre-analyzed for use as pre-modeled scenes in certain implementations.

These examples and other examples of pre-modeled scenes that may be detected at operation 202 may each be associated with a model asset that is accessible to the image rendering system. The model asset may include various types of information describing the pre-modeled scene including, for example, depth data for the pre-modeled scene, data indicative of virtual materials or surfaces that are to be simulated for the pre-modeled scene, data indicative of virtualized elements to be associated with the pre-modeled scene in particular ways, and so forth. As a few examples, a model asset for a particular model village may indicate that a virtual villager is to be located on a particular street corner of the model village to sell virtual goods from a virtual cart; a model asset for a particular model trainset may indicate an open area in the middle of the track where a virtual body of water (e.g., a pond) or a virtual mountain is to be simulated; a model asset for a particular office space may indicate walls where virtual posters are to be placed; and so forth.

Pre-modeled scenes detected at operation 202 may be pre-modeled in any suitable manner by any suitable entity and at any suitable time prior to the detection at operation 202. For instance, in the example of a physical model such as a tabletop village scene described above, a manufacturer of the physical model may provide the model asset associated with the physical model along with the sale of the model. As such, the model asset may be stored in an asset storage server accessible to system 100 and, in certain implementations, may be configurable by a user who may wish to have control over certain aspects of the AR experience (e.g., to define a desert or a water feature in the middle of the scene, to define materials and physical properties of virtual objects in the scene, etc.). As another example, for a pre-modeled scene such as a particular classroom or office space, the user may scan the room using the AR presentation device to generate the model asset and may place virtual objects to be simulated within the space as may be desired (e.g., placing virtual desks or lab equipment in a pre-modeled classroom, placing virtual posters or other decor to adorn the walls of a given office space, etc.). As will be described in more detail below, various object identification, object recognition, machine learning, and/or other computer vision techniques may be used to analyze relationships of elements depicted in the capture frame. In this way, system 100 may compare captured imagery with known pre-modeled scenes and determine that a particular pre-modeled scene (for which a model asset is available) is depicted in the captured frame.

At operation 204, system 100 may generate an augmentable representation of the pre-modeled scene. For example, the augmentable representation may be generated based on the captured frame received from the AR presentation device at operation 202, as well as based on the model asset for the pre-modeled scene, which may be accessed by system 100 in response to the detecting of the pre-modeled scene at operation 202. The augmentable representation of the pre-modeled scene generated at operation 204 may be implemented as any type of 3D model or other representation that indicates how various aspects of the model asset (e.g., virtual objects, virtual surfaces, virtual materials, etc.) are to be integrated with real-world elements depicted in the captured image. For instance, as will be described and illustrated in more detail below, a pre-modeled scene implemented as a tabletop village scene may include several real-world structures (e.g., a castle, various cottages, a blacksmith shop, etc.) and an augmentable representation may indicate where virtual light sources, materials, virtual objects (e.g., characters), and/or other virtualized elements are to be simulated relative to these real-world structures.

At operation 206, system 100 may generate an augmented version of the captured frame. For example, the augmented version of the captured frame (the "augmented frame") may be generated based on the augmentable representation generated at operation 204 by performing a plurality of render passes each configured to simulate a different virtualized element of a plurality of virtualized elements that ultimately augment the pre-modeled scene within the augmented version of the captured frame. One or more render passes performed as part of operation 206 may determine how light from a virtual torch used by a virtual character should appear to light real and virtual objects surrounding the torch, one or more other render passes may determine how real and virtual objects are to reflect from a virtual body of water, and so forth. As will be described in more detail below, certain of these render passes may be performed independently from one another, thereby allowing for parallel rendering work to be performed to increase the amount of processing that can be accomplished in real time for a given image frame. The information generated by each of the plurality of render passes may be combined in some way to generate the augmented frame, which, as described above, may depict the real elements as augmented by virtualized elements including virtual reflections, virtual objects, virtual materials and surfaces (e.g., specular surfaces such as snow, water, ice, or sand), virtual light sources and their effects (e.g., shadows cast by and cast onto real and/or virtual objects), and so forth.

At operation 208, system 100 may provide the augmented version of the captured frame to the AR presentation device. In this way, the AR presentation device may be implemented as a thin client or other relatively unsophisticated device with relatively modest processing resources that is nonetheless capable of presenting highly complex and accurate graphics for the AR experience as a result of significant processing work being offloaded to an implementation of system 100 operating on a MEC system, a cloud-based system, or other suitable off-device processing resources.

Figure 3:
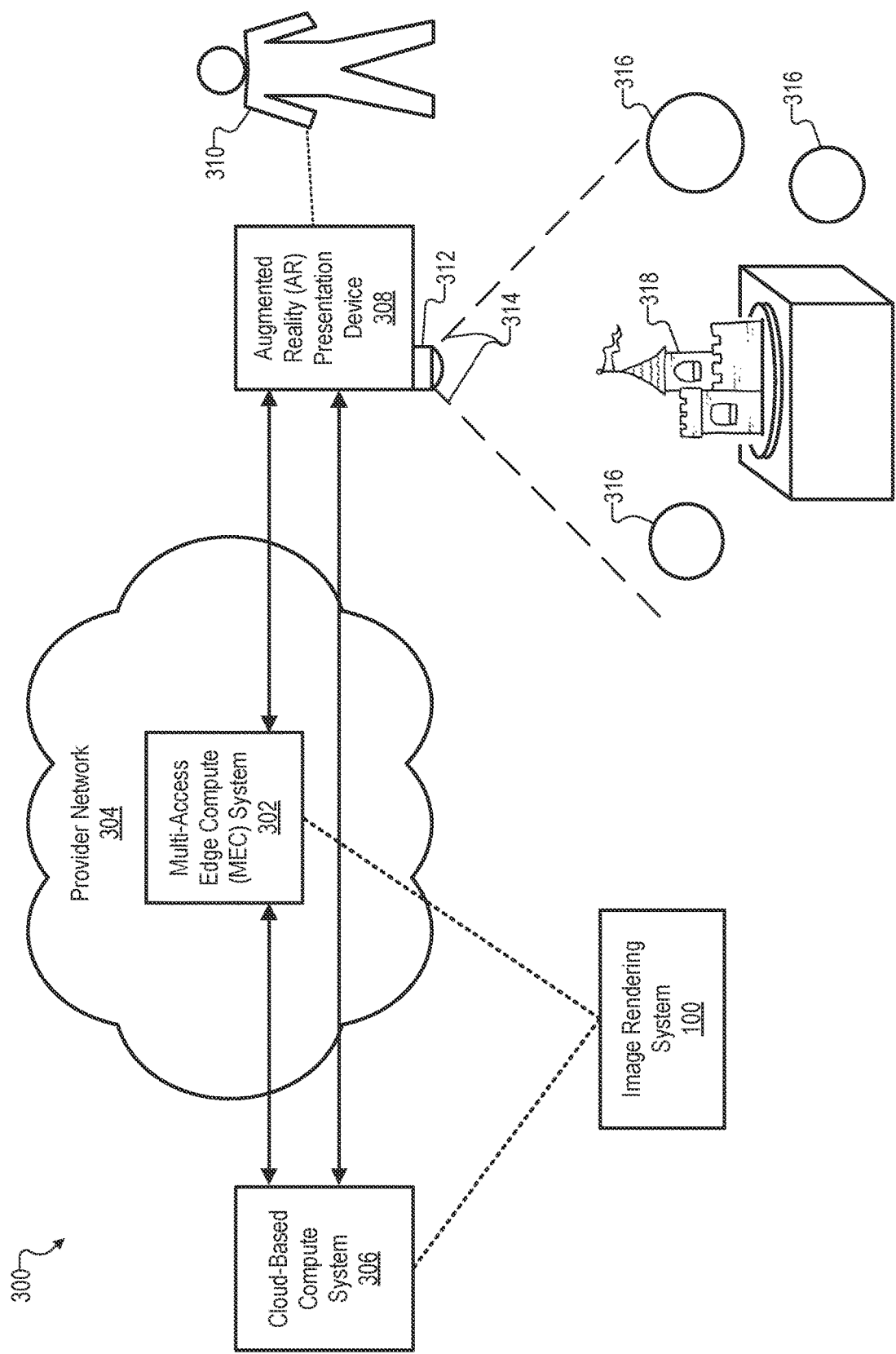
FIG. 3 shows an illustrative configuration in which the image rendering system of FIG. 1 may operate according to embodiments described herein.

FIG. 3 shows an illustrative configuration 300 in which system 100 operates in accordance with principles described herein. Specifically, as illustrated with dotted lines in the example of configuration 300, system 100 may be implemented by a MEC system 302 operating on a provider network 304, by a cloud-based compute system 306 that is communicatively coupled to (but not necessarily implemented by) provider network 304, or by a combination of these and/or other server-side systems (not explicitly shown) that are communicatively coupled via provider network 304 to an AR presentation device 308.

Provider network 304 may be implemented by a provider-specific wired or wireless communications network (e.g., a cellular network used for mobile phone and data communications, a 5G network or network of another suitable technology generation, a cable or satellite carrier network, a mobile telephone network, etc.), and may be operated and/or managed by a provider entity such as a mobile network operator (e.g., a wireless service provider, a wireless carrier, a cellular company, etc.). The provider of provider network 304 may own or control all of the elements necessary to sell and deliver communications services to AR presentation device 308 and a user 310 of AR presentation device 308 (as well as to other AR presentation devices and users not explicitly shown in FIG. 3), including radio spectrum allocation, wireless network infrastructure, back haul infrastructure, provisioning of devices, network repair for provider network 304, and so forth.

While not explicitly shown in configuration 300, it will be understood that provider network 304 may be integrated with other network infrastructure that is outside of the control of the provider. For example, such external network infrastructure may include the Internet, one or more wide area networks or local area networks to which AR presentation device 308 is connected, a content delivery network, and/or any other suitable network or networks managed by any third parties outside of the control of the provider of provider network 304. All the network elements associated with provider network 304 and any other network infrastructure used to connect AR presentation device 308 to MEC system 302 and/or cloud-based compute system 306 may implement or employ any suitable communication technologies, devices, media, protocols, or the like as may serve a particular implementation.

As will be described in more detail below, MEC system 302 may represent one or more computing systems, devices, nodes, or other collections of computing resources that are integrated within a provider network such as provider network 304 and configured for use by multiple clients of the provider network. For example, MEC system 302 may be integrated within one or more radio access network ("RAN") resources, core network resources, service access point ("SAP") resources, or other suitable resources of provider network 304. MEC system 302 may be integrated within provider network 304 such as by being deployed on provider network 304 as an edge node that can communicate with devices and systems connected to provider network 304 with low latency. For example, if provider network 304 includes or is implemented by 5G network technology, MEC system 302 may include or be implemented as a 5G node in a fixed 5G deployment, a mobile 5G deployment (e.g., a network on wheels), or another suitable deployment.

Because MEC system 302 is integrated within (e.g., implemented as part of) provider network 304, it will be understood that MEC system 302 is separate from client systems served by MEC system 302 such as AR presentation device 308. Additionally, because a MEC system may include shared resources that can be leveraged by multiple client systems (e.g., multiple AR presentation devices, etc.), it may be efficient and economical for MEC system 302 to employ a considerable wealth of computing power (e.g., significantly more computing power and resources than may be practical to be included within AR presentation device 308). For instance, MEC system 302 may include a plurality of parallel processors (e.g., central processing units ("CPUs"), graphics processing units ("GPUs"), etc.) for efficiently performing various processing-intensive operations (e.g., graphics rendering operations, raytracing operations, etc.) that may be performed by system 100, as described in more detail below.

Moreover, because MEC system 302 is deployed on provider network 304, there may be a very low transport latency associated with exchanging data between MEC system 302 and AR presentation device 308, thereby allowing MEC system 302 to perform off-device image frame rendering for AR presentation device 308 with high responsiveness that will appear substantially instantaneous to user 310 (e.g., as if the tasks are being performed locally on AR presentation device 308). In some examples, the latency associated with operations performed by MEC system 302 may be unperceivable by user 310, thereby enabling and bolstering the real-time nature of system 100 described above.

MEC system 302 may also be differentiated from computing resources deployed outside of provider network 304. For example, cloud-based systems such as cloud-based compute system 306 may also be utilized for off-device image frame rendering in certain examples, but such cloud-based compute systems may be operated by third parties other than the provider of provider network 304. As such, communication with such cloud servers may be performed only by way of provider network 304 and external networks described above (rather than just by way of provider network 304), potentially adding significant latency as compared to the latency achieved with communications to MEC system 302 directly by way of provider network 304. Accordingly, while system 100 may be at least partially implemented by such cloud systems in certain implementations, it will be understood that the benefits described herein of real-time and ultra-low-latency graphics rendering (e.g., graphics rendering with latency that is unperceivable by users) may be implemented most effectively and efficiently when system 100 is implemented at the edge of provider network 304 by devices such as are included in MEC system 302.

Whether system 100 is implemented by MEC system 302, by cloud-based compute system 306, or by some combination of these and/or other server-side systems accessible by way of a network such as provider network 304, configuration 300 shows that AR presentation device 308 is communicatively coupled to an implementation of system 100 such that system 100 may perform off-device image frame rendering services as AR presentation device 308 operates an AR application. As has been mentioned, because intensive frame rendering operations may be offloaded to devices such as may be included in MEC system 302 and/or cloud-based compute system 306, AR presentation device 308 may be implemented as a thin client or other device with relatively modest processing resources. For example, AR presentation device 308 may be implemented as (or may be included within) a consumer computing system such as a mobile device (e.g., a smartphone, a tablet computing device, etc.), a dedicated VR or AR presentation device (e.g., a head-mounted device configured to display graphics directly in front of each eye of user 310), a portable or stationary computing device (e.g., a personal desktop or laptop computer, etc.), a television device, or any other system or device as may serve a particular implementation. In some examples, AR presentation device 308 may include one or more display screens (e.g., traditional display screens, partially transparent heads-up display (HUD) screens, computer monitors, etc.) configured to display rendered frames received from system 100.

User 310 may represent any person who views augmented frames presented by AR presentation device 308 and will be understood to typically have at least some degree of control over what graphics AR presentation device 308 presents. For example, user 310 may move AR presentation device 308 with respect to a real-world scene within which an AR experience is provided. In this way, user 310 may control the viewpoint from which the AR experience is provided.

In operation, AR presentation device 308 may capture a series of image frames ("captured frames") and provide these frames to an implementation of system 100 operating on an off-device system such as MEC system 302 and/or cloud-based compute system 306. System 100 may process each captured frame received from AR presentation device 308 in accordance with method 200 (described above) and/or in accordance with other techniques and principles described herein. In this way, system 100 may generate and provide back to AR presentation device 308 an augmented version of each captured frame. AR presentation device 308 may then present (e.g., display) each of these augmented frames for the enjoyment of user 310 during a real-time AR experience.

As described in relation to method 200 above, it may be the case during certain AR experiences that captured frames include depictions of a known pre-modeled scene. For example, a capture device 312 of AR presentation device 308 (e.g., a video camera integrated with or connected to AR presentation device 308) is shown at the moment depicted in FIG. 3 to have a field of view 314 that encompasses various objects (and parts of objects). Certain objects labeled as objects 316 will be understood to not have any particular predefined significance to system 100. For example, these objects may not be identified as forming part of any identifiable pre-modeled scene. In contrast, one or more other objects included in FIG. 3 and labeled as pre-modeled scene 318 will be understood to represent one or more objects that do have predefined significance to system 100. For example, these objects may represent a physical model (e.g., a tabletop village that includes a castle, various other structures, certain landscapes, etc., as described above) that system 100 may identify as a pre-modeled scene for which a model asset is available. As such, these real objects will be referred to collectively as pre-modeled scene 318.

Based on the identification of the pre-modeled scene and the data included in the model asset accessed for the identified pre-modeled scene, system 100 may render augmented frames depicting the pre-modeled scene in highly accurate ways (e.g., due to depth data included in the model asset) and in ways that show high levels of detail and interaction between real and virtual objects, light sources, and so forth. For example, occlusion of virtual objects by real objects (e.g., when a virtual dragon flies behind a tower of the real model castle) may be rendered with a high degree of accuracy due to precise depth data for the castle tower included in the model asset; reflections and light interactions may be rendered in a way that makes both virtual and real objects look highly realistic; and so forth.

The implementation of system 100 shown in configuration 300 may implement a thin client architecture. As such, it will be understood that server-side resources such as those included in MEC system 302 and/or cloud-based compute system 306 may perform the majority of the processing work for rendering image frames for the AR application. In certain examples, a software stack for this thin client architecture may include a computer vision back end and an offscreen renderer and a Web RTC integration for passing the captured and augmented frames between the implementation of system 100 and AR presentation device 308. While AR presentation device 308 may, in certain implementations, perform certain tasks that are associated with the rendering of augmented frames, it will be understood that off-device multi-access servers such as those included in MEC system 302 and/or cloud-based compute system 306 may perform most or all of the rendering work in other implementations. In the following example, it will be assumed that system 100 is fully implemented by MEC system 302 due to the latency advantages for such implementations that have been described. However, it will be understood that similar principles as described for the MEC system implementation below may also apply for implementations leveraging cloud-based and other computing resources.

Figure 4:
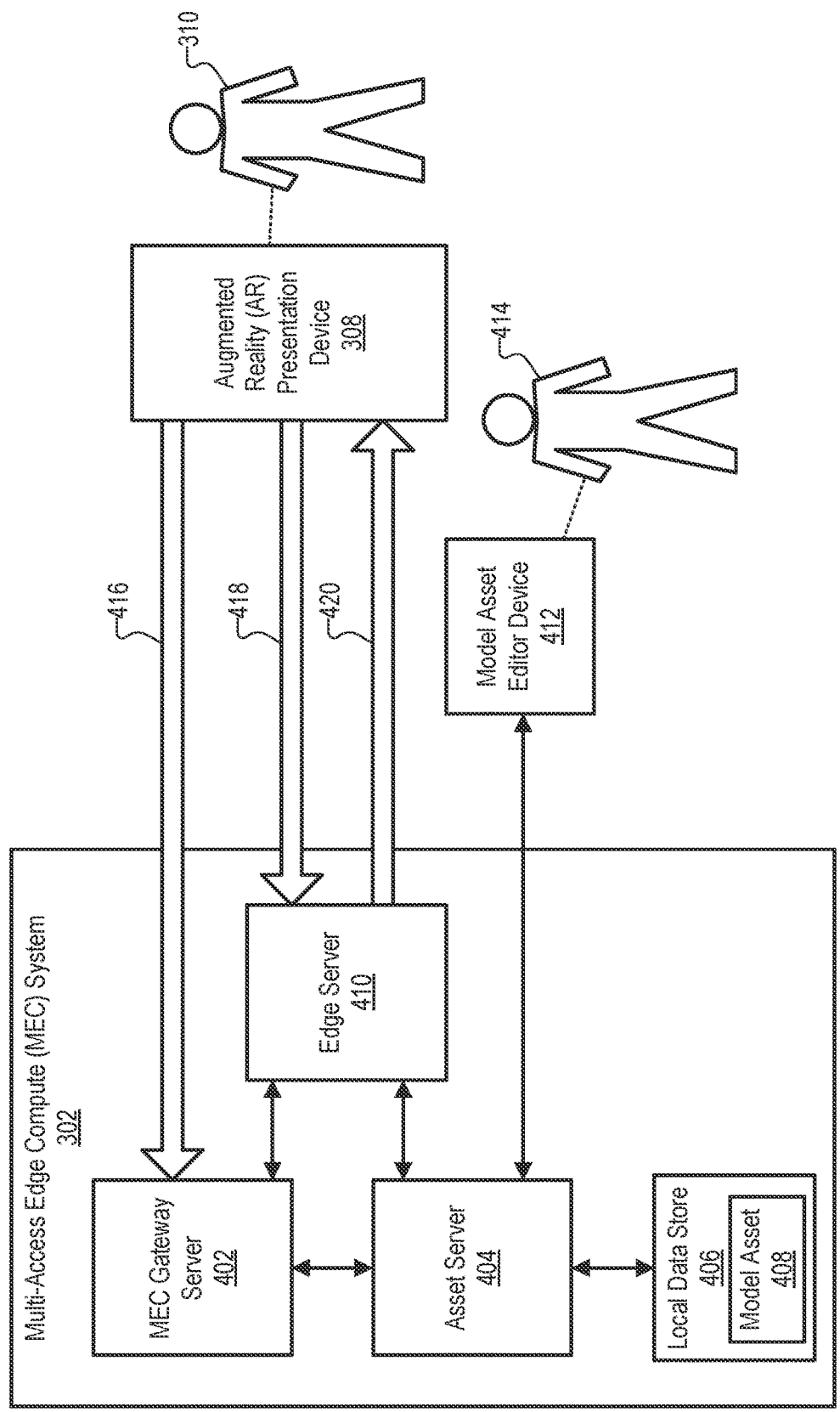
FIG. 4 shows an illustrative implementation of a multi-access edge compute (MEC) system implementing the image rendering system of FIG. 1 according to embodiments described herein.

FIG. 4 shows an illustrative implementation of MEC system 302 configured to implement system 100 in accordance with principles described herein. In the example of FIG. 4, system 100 is shown to be implemented as a MEC system (i.e., MEC system 302) that includes various components that will now be described. First, MEC system 302 includes a MEC gateway server 402 that may be configured to receive a request (e.g., from AR presentation device 308) to provide AR content based on image content captured by AR presentation device 308. Specifically, the image content may include the captured frame discussed in the following extended example, as well as a series of other frames (e.g., 30 frames per second, etc.) that may be captured and processed in a similar way (e.g., based on additional requests or based on the initial request, which may serve to set up MEC processing for the entire frame sequence). MEC gateway server 402 may be configured to orchestrate service for AR presentation device 308 based on the request, as well as to route messages (or arrange for message routing) between AR presentation device 308 and a selected compute node (e.g., edge server) that does the actual processing work.

MEC system 302 further includes an asset server 404 communicatively coupled to MEC gateway server 402 and to a local data store 406 that stores a model asset 408 for a particular pre-modeled scene such as pre-modeled scene 318. Asset server 404 may be configured to access model asset 408 from local data store 406 in response to direction from MEC gateway server 402 based on a request received from AR presentation device 308, as will be described in more detail below.

MEC system 302 further includes an edge server 410 that is communicatively coupled to MEC gateway server 402 and to asset server 404. For example, edge server 410 may represent a MEC node selected by MEC gateway server 402 during an orchestration process instigated by the service request from AR presentation device 308. In connection with MEC gateway server 402 and asset server 404, edge server 410 may receive captured frames from AR presentation device 308, perform off-device image frame rendering operations described herein, and provide augmented frames back to AR presentation device 308. More particularly, edge server 410 may be configured, in response to direction from MEC gateway server 402 based on the request, to: 1) receive the captured frame from AR presentation device 308; 2) receive model asset 408 from asset server 404; and 3) perform operations of method 200 including the detecting of the pre-modeled scene, the generating of the augmentable representation, and the generating and providing of the augmented version of the captured frame.

Along with illustrating certain servers and subcomponents of an illustrative implementation of MEC system 302, FIG. 4 also shows a model asset editor device 412 associated with an asset editor 414 and communicatively coupled to asset server 404. Using model asset editor device 412, asset editor 414 may create, modify, duplicate, save, delete, and/or otherwise manipulate and edit model assets such as model asset 408. In certain implementations, model asset editor device 412 may be implemented as a general-purpose computer device (e.g., a laptop computer, a desktop or server machine, etc.) that communicates with asset server 404 by way of any suitable application programming interface (API). Asset server 404 may present a web interface to asset editor 414, thereby allowing asset editor 414 to manipulate model assets from any location he or she may wish to work (e.g., rather than needing to be physically present near asset server 404).

To generate a model asset, asset editor 414 may scan a pre-modeled scene that is to be represented by the model asset to generate depth data for the pre-modeled scene that is to be stored as part of the model asset. Along with entering this depth data, asset editor 414 may also add or remove virtual objects (e.g., characters, inanimate objects, etc.) to the pre-modeled scene, add or remove virtual light sources to the pre-modeled scene, edit physical properties of the pre-modeled scene (e.g., change virtual materials of which different objects in the pre-modeled scene are constructed), and so forth. Referring to a pre-modeled scene such as the tabletop village model described above, for example, asset editor 414 may work for a company that produces and sells the tabletop village models and, in the course of creating a particular version of the model, may generate and upload depth data for the model, occlusion assets (e.g., virtual objects, etc.) that are placed in the scene, materials and physics properties (e.g., a particular surface being made of virtual metal or glistening water rather than dull plastic from which the physical model is actually constructed), virtual portals that may be placed within the scene and allow objects and characters to instantly transport between different locations, and so forth.

In some examples, the depth data may be detected based on images captured from various vantage points surrounding the pre-modeled scene using stereoscopic image capture devices or other depth detection devices. For a commercial product such as a pre-modeled scene implemented as a physical model, depth data generation may be performed at the factory where the physical model is produced, while, for other types of pre-modeled scenes (e.g., specific rooms within a user's home or office, etc.), depth data generation may be performed by the user by moving the AR presentation device or another image capture device to various vantage points within the scene (e.g., using simultaneous localization and mapping (SLAM) or other such digital modeling techniques). Based on the data and direction from asset editor 414, model asset editor device 412 and/or asset server 404 may compile model asset 408 and/or other model assets into a binary form that is stored in local data store 406 so as to be quickly streamed into a live application to provide depth and material detail in real-time.

Once model asset 408 has been created and is stored in local data store 406, FIG. 4 shows several block-style arrows representative of specific communications that may be exchanged between MEC system 302 and AR presentation device 308 to implement off-device image frame rendering in accordance with principles described herein. First, a request 416 is shown as a communication from AR presentation device 308 to MEC system 302 (to MEC gateway server 402 in particular). Request 416 represents a request for MEC system 302 to provide AR content based on image content captured by AR presentation device 308. For example, the image content includes a series of captured frames that are to be transmitted to edge server 410 once orchestration has been performed to identify which edge server is to provide service to AR presentation device 308.

One particular captured frame 418 is shown to be transmitted from AR presentation device 308 to edge server 410 once the requested service orchestration is complete. Captured frame 418 may be included with a series of many other captured frames (e.g., 30 frames per second in one example) that are similarly provided (e.g., streamed) from AR presentation device 308 to edge server 410. After edge server 410 performs off-device image frame rendering procedures on captured frame 418 in the ways described herein (e.g., utilizing model asset 408 from local data store 406 to perform method 200, etc.), FIG. 4 shows that an augmented frame 420 is returned from edge server 410 back to AR presentation device 308. Augmented frame 420 may be presented to user 310 by AR presentation device 308 as part of an AR presentation. In certain examples, this implementation of system 100 on MEC system 302 may receive captured frame 418 from AR presentation device 308 and perform the various processing operations (e.g., detecting the pre-modeled scene, generating the augmentable representation, generating and providing augmented frame 420, etc.) in real time and in response to request 416 received from AR presentation device 308.

Figure 5:
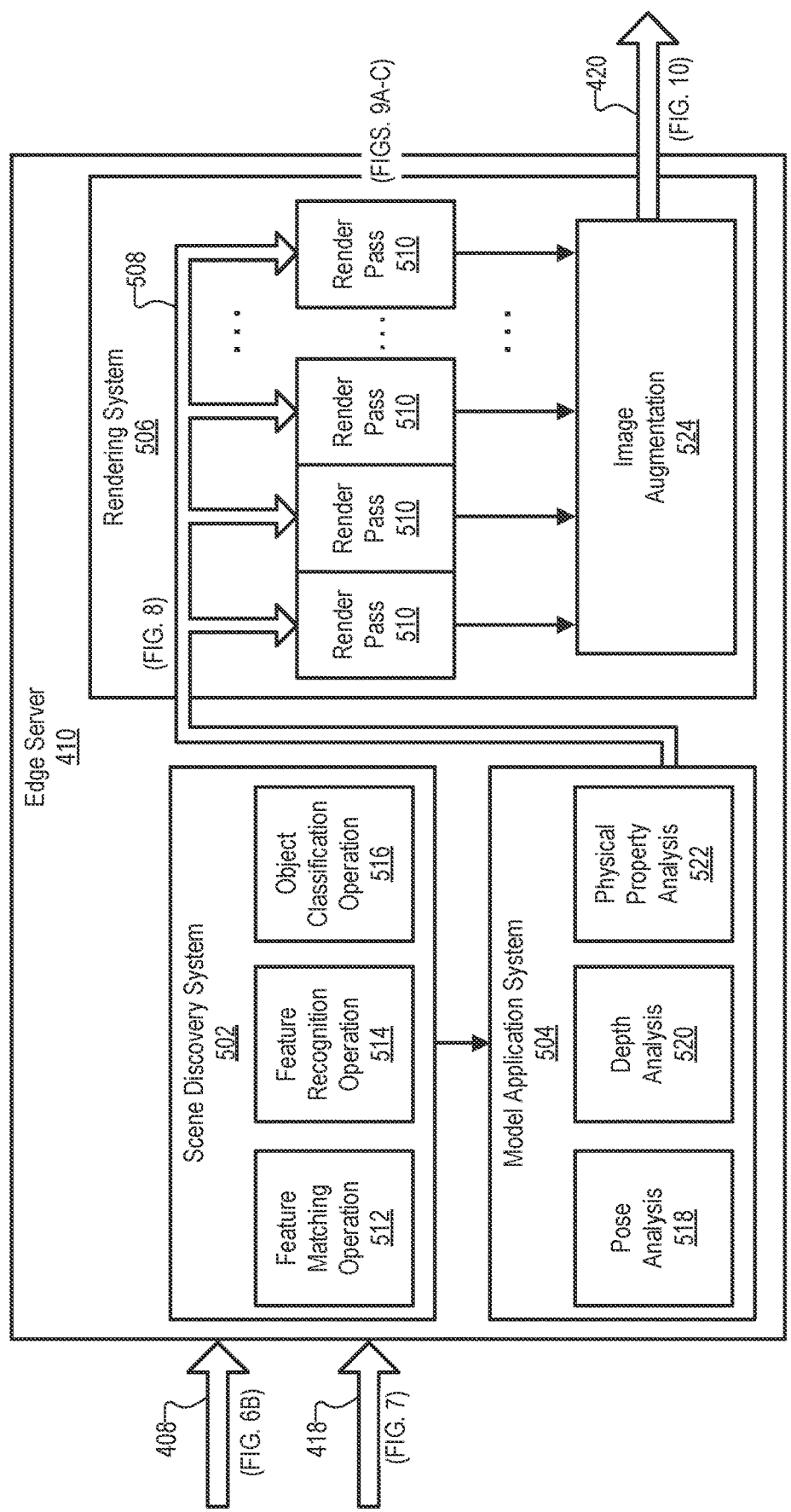
FIG. 5 shows an illustrative implementation of the edge server of FIG. 4 according to embodiments described herein.
Figure 6:
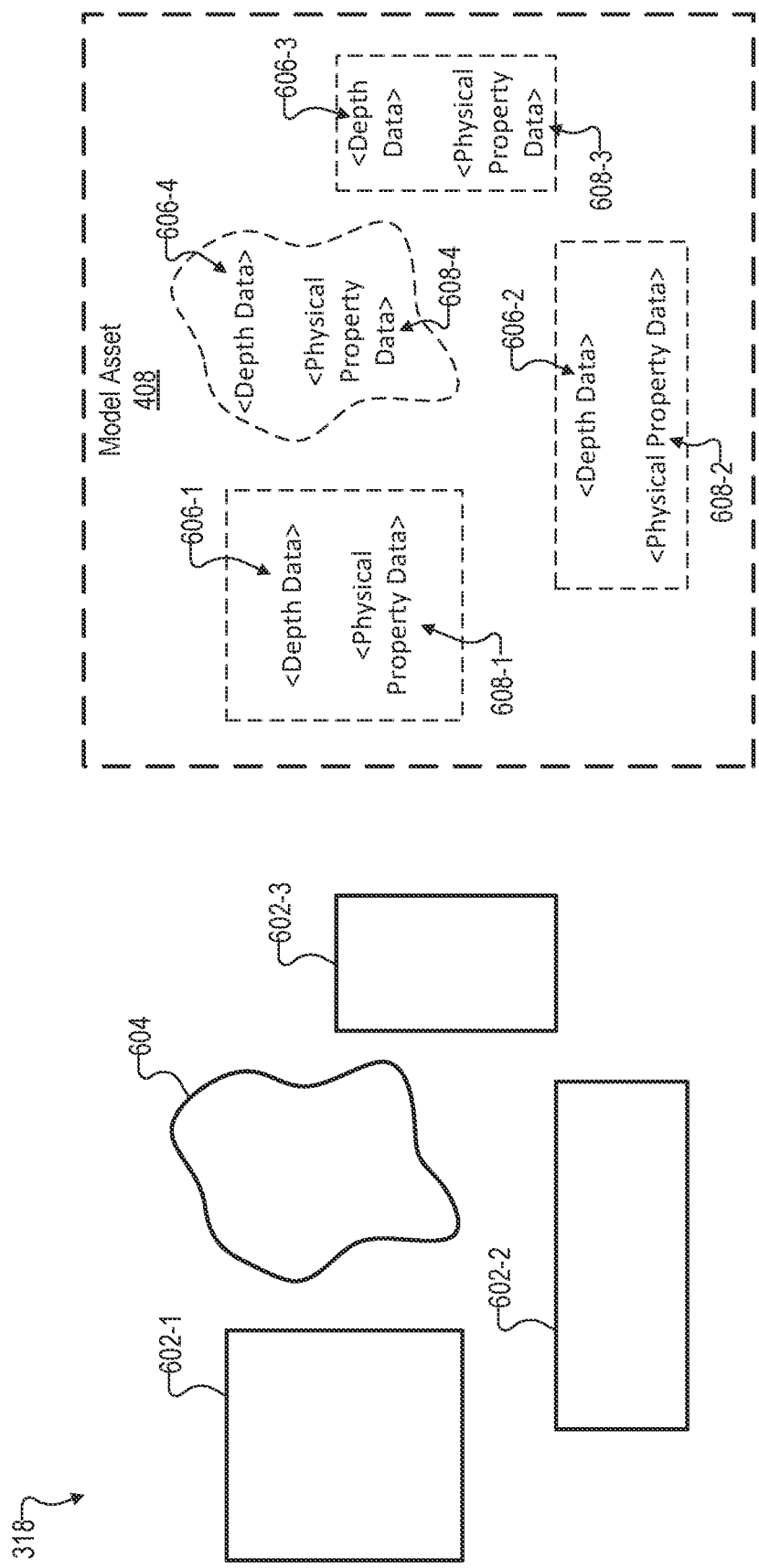
FIG. 6A shows an illustrative pre-modeled scene that may be depicted within image frames captured by an AR presentation device according to embodiments described herein.
FIG. 6B shows illustrative aspects of a model asset for the pre-modeled scene of FIG. 6A according to embodiments described herein.

To illustrate various operations that may be performed by edge server 410 in certain examples, FIG. 5 shows an illustrative implementation of edge server 410 in accordance with principles described herein. As has been described in relation to FIG. 4, FIG. 5 shows that edge server 410 receives model asset 408 and captured frame 418 as data inputs and, after performing various operations and different types of data processing, provides augmented frame 420 as a data output. More particularly, model asset 408 and captured frame 418 may be provided as inputs to a scene discovery system 502 configured to detect the pre-modeled scene within captured frame 418 based on model asset 408. Model asset 408 and captured frame 418 may also be provided as inputs to a model application system 504 that, once the pre-modeled scene has been detected, generates an augmentable representation of the pre-modeled scene. This augmentable representation may then be used by a rendering system 506 to generate the augmented version of captured frame 418 (i.e., augmented frame 420), which may be provided back to the same AR presentation device 308 that originally provided captured frame 418.

In certain examples, edge server 410 may perform all these operations for each captured frame in a series of captured frames that includes captured frame 418. In other examples, edge server 410 may perform all of the operations for one captured frame (e.g., captured frame 418) while performing modified (e.g., simplified) versions of the operations or only some of the operations for other captured frames in the sequence. For example, once scene discovery system 502 has detected the pre-modeled scene and model application system 504 has generated the augmentable representation with respect to one captured frame, the pre-modeled scene may be assumed to be present in subsequent captured frames and the augmentable representation may be updated based on tracking of the pre-modeled scene rather than by analyzing the frame from scratch.

A detailed example will now be described and illustrated with reference to FIG. 5 and various figures indicated parenthetically in FIG. 5 (i.e., FIGS. 6B-10). Specifically, following a description of an illustrative pre-modeled scene with respect to FIG. 6A, parentheticals in FIG. 5 indicate that certain aspects of model asset 408 will be described with reference to FIG. 6B, an illustrative example of captured frame 418 will be described with reference to FIG. 7, an augmentable representation 508 of the pre-modeled scene will be described with reference to FIG. 8, various types of render passes 510 will be described with reference to FIGS. 9A-9C, and the final augmented frame 420 that is provided back to AR presentation device 308 will be described with reference to FIG. 10. Additionally, other operations, analyses, and data processing illustrated in FIG. 5 to be performed by the subsystems of edge server 410 (e.g., scene discovery system 502, model application system 504, and rendering system 506) will also be described in connection with this detailed example.

FIG. 6A shows an illustrative implementation of pre-modeled scene 318, which, as mentioned above, may be implemented in this example as a set of structures in a tabletop model of a village or the like. For example, as illustrated by several rectangular shapes, structures 602 (i.e., structures 602-1, 602-2, and 602-3) may represent specific miniaturized buildings included within the model (e.g., a castle, a cottage, a blacksmith shop, an animal stable, etc.). The irregular shape in the midst of structures 602 may represent a landscape feature 604 such as a water feature (e.g., a lake or pond), a forest, a mountain, a desert, a tar pit, or the like. For instance, the physical model may leave a blank space here between structures 602 that, based on properties programmed into the model asset described below, may be augmented to implement any of these or other suitable landscape features.

Details are sparse in the illustration of FIG. 6A to allow pre-modeled scene 318 to broadly represent a large array of different types of pre-modeled scenes. However, it will be understood that certain details may be considered requisites for a scene to be identified as a particular pre-modeled scene, while other details may be considered non-requisite. For instance, certain details such as the rooftop colors of structures 602 or the number of turrets or battlements on the castle may be requisite features (such that, if the color or number changed, the scene would no longer properly be identified as pre-modeled scene 318). As another example, the exact positions of structures 602 and landscape feature 604 relative to one another may be considered to be a non-requisite feature of pre-modeled scene 318 (such that, if the structures were rearranged somewhat, the scene would still be properly identified as pre-modeled scene 318).

While a tabletop village scene is used as an example in this case, it will be understood, as has been described above, that pre-modeled scenes of various types may be utilized in other implementations. For instance, along with modeled scenes such as villages, model train sets, scenes constructed from kits of plastic blocks, and the like, other types of scenes may also be detected as pre-modeled scenes in certain implementations. For example, full rooms (e.g., specific rooms of a home or office of the user, etc.) may be identifiable by specific layouts of the rooms and/or particular objects included within the rooms. Additionally, while examples described herein generally presume that scenes are "pre-modeled" by nature of depth scanning and other scene programming (i.e., preparation of the model asset) being performed at a point in time prior to the presentation of an AR experience, it will be understood that certain pre-modeled scenes may be modeled based on images captured during the AR experience (e.g., in a just-in-time manner immediately prior to the pre-modeled scenes being recognized).

FIG. 6B shows illustrative aspects of model asset 408 for pre-modeled scene 318 as illustrated in FIG. 6A. It will be understood that, while the shapes outlined with solid lines in FIG. 6A represented physical structures and objects in the real world, model asset 408 and its corresponding shapes outlined with dashed lines in FIG. 6B represent data that describes and/or is otherwise associated with pre-modeled scene 318. For example, for each of structures 602 and landscape feature 604, FIG. 6B shows that model asset 408 includes depth data 606 representative of the physical objects (i.e., depth data 606-1 through 606-3 representing structures 602-1 through 602-3, respectively, and depth data 606-4 representing landscape feature 604). Additionally, FIG. 6B shows that physical property data 608 (i.e., physical property data 608-1 through 608-3 for structures 602-1 through 602-3, respectively, and physical property data 608-4 for landscape feature 604) is also included in model asset 408 to represent various physical attributes, characteristics, capabilities, materials, appearances, aesthetics, and/or other properties of each of the structures 602 and landscape feature 604.

As one example, if structure 602-1 exists in the real world as a small castle formed of a shiny gray plastic, depth data 606-1 may detail spatial characteristics of the plastic castle as it has been manufactured and previously scanned, while physical property data 608-1 may indicate that the castle should appear to be made of a rough gray stone with no reflectivity (rather than the shiny gray plastic of which the real model castle is constructed). As another example, if landscape feature 604 exists in the real world as a black rubber mat placed near the various structures 602, depth data 606-4 may detail a spatial pose of the mat and physical property data 608-4 may indicate that the landscape feature should be implemented as a shimmering pond or a sandy desert or the like. For instance, if implemented as a pond, physical property data 608-4 may give the surface reflective properties (e.g., such that clouds or other objects floating over the pond can be seen to be reflected on a mirror-like surface of the pond) as well as specular properties (e.g., such that random glimmers of specular light are shown to reflect from the pond's surface to give the realistic appearance of water rippling in the sunlight) that will be described in more detail below.

Model asset 408 may be used to simulate geometry that is hidden (e.g., out of frame) from a vantage point of a particular captured frame, as well as to provide material and physical data to real world surfaces as seen through the captured frame. As has been mentioned and as will be described in more detail below, the combination of data stored in model asset 408 may allow for a wide variety of rendering capabilities to be performed which would be difficult or not possible without model asset 408 (e.g., based on captured frame 418 alone). Model asset 408 may be generated from high resolution image data and represented as a binary data stream or in accordance with any other suitable data form or format. This data stream may be cached on an asset server local to edge server 410 (e.g., asset server 404) and may be more permanently stored in local data store 406 (as described above). As mentioned above, a web front end may allow a user (e.g., asset editor 414, user 310, etc.) to edit the scene data and add additional data like different materials (e.g., changing structure 602-1 from stone to wood, changing landscape feature 604 from a pond to a desert, etc.), or physical properties (e.g., making a material destructible or impervious to damage, creating a portal, changing a color of a material, adding a billboard or other sign, etc.).

In some examples, model asset 408 may include or be implemented as a point cloud, volumetric mesh, or other three-dimensional representation of the pre-modeled scene and/or objects and structures within the pre-modeled scene. In other examples, model asset 408 may include a two-dimensional or other suitable representation of the pre-modeled scene. Additionally, as mentioned above, model asset 408 may be generated prior to runtime (i.e., before the AR experience is being presented) in certain examples, while being generated at runtime (i.e., as the AR experience is being presented) in other examples.

Figure 7:
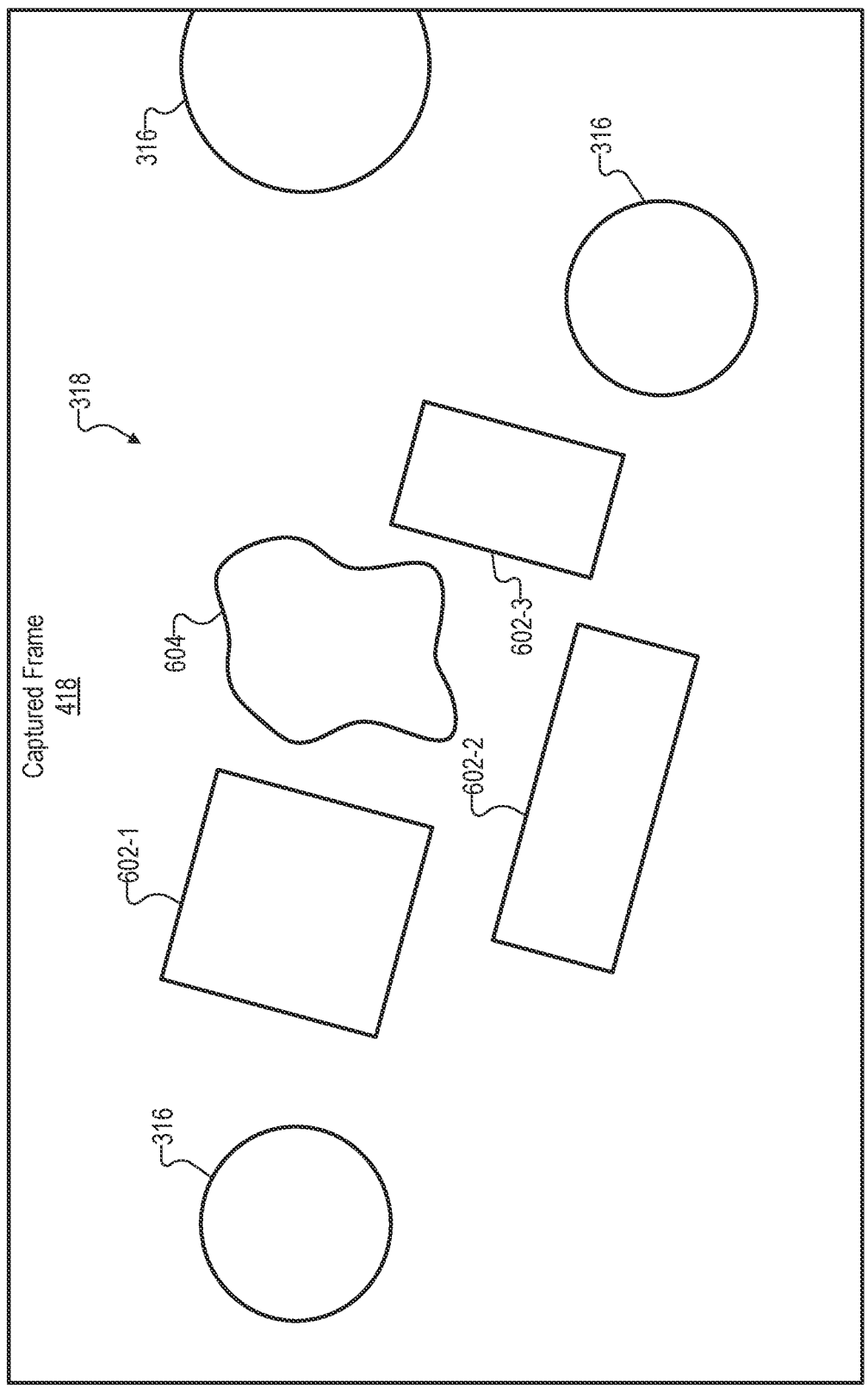
FIG. 7 shows an illustrative captured frame that depicts the pre-modeled scene of FIG. 6A according to embodiments described herein.

Along with model asset 408, the other input shown in FIG. 5 to be utilized by edge server 410 is captured frame 418. To illustrate, FIG. 7 shows an illustrative implementation of captured frame 418 that depicts pre-modeled scene 318 along with other objects 316 that, as described above in relation to FIG. 3, may be present near pre-modeled scene 318 within field of view 314 of AR presentation device 308 when captured frame 418 is captured. As shown in captured frame 418, pre-modeled scene 318 is rotated somewhat from how the scene is illustrated in FIGS. 6A and 6B. However, it can be seen that the same structures 602-1 through 602-3 and the same landscape feature 604 can be identified in the same relative configuration as represented in model asset 408 shown in FIG. 6B. Accordingly, despite the presence of other objects 316 (which, in some examples, could partially occlude parts of pre-modeled scene 318) and/or the particularities of field of view 314 (which, in some examples, could cause pre-modeled scene 318 to be more or less zoomed in, closer to the edge of the frame or partially out of the frame, etc.), system 100 may be configured to detect pre-modeled scene 318 within captured frame 418 based on what is known about pre-modeled scene 318 from model asset 408.

Returning to FIG. 5, this detection of pre-modeled scene 318 within captured frame 418 may be performed, more particularly, by scene discovery system 502 in the edge server 410 implementing part of system 100 in this example. As shown in scene discovery system 502, the detecting of pre-modeled scene 318 within captured frame 418 may include (e.g., may be performed by) at least one of a feature matching operation 512, a feature recognition operation 514, or an object classification operation 516. Any combination of operations 512-516 (and/or other similar operations that may be included in a computer vision application programming interface) may be used during runtime and in series or parallel with one another to match real world surfaces depicted in captured frame 418 with known surfaces of pre-modeled scene 318 represented in model asset 408. For example, feature matching operation 512 may involve correlating specific features that are both identified in captured frame 418 and also represented in model asset 408; feature recognition operation 514 may involve identifying features that correspond with a known type of object (e.g., a castle with four towers and a central courtyard, etc.) that is represented within model asset 408; and object classification operation 516 may involve determining, based on an analysis of various features detected in captured frame 418, that a depicted object is a particular type of object defined in model asset 408. Using any of these or other similar techniques as may serve a particular implementation, scene discovery system may discover that pre-modeled scene 318 is depicted in captured frame 418 and disclose this information to model application system 504.

Once scene discovery system 502 determines that pre-modeled scene 318 is depicted in captured frame 418, model application system 504 may be configured to analyze captured frame 418 and model asset 408 in various ways to generate augmentable representation 508 of pre-modeled scene 318. For example, model application system 504 may perform a pose analysis 518, a depth analysis 520, a physical property analysis 522, or any suitable combination of these analyses to prepare augmentable representation 508 for processing by rendering system 506.

In one illustrative implementation, it will be assumed that AR presentation device 308 has captured and provided captured frame 418 and that model asset 408 includes depth data representing pre-modeled scene 318 (e.g., depth data such as represented by depth data 606). In this example, the generating of augmentable representation 508 by model application system 504 may include pose analysis 518, in which a pose of AR presentation device 308 is determined based on a depiction of pre-modeled scene 318 within captured frame 418 (i.e., for a moment in time when AR presentation device 308 generated captured frame 418). For instance, the pose of the AR presentation device may be determined with respect to pre-modeled scene 318 or, equivalently, a pose of pre-modeled scene 318 may be determined with respect to AR presentation device 308. Pose analysis 518 may further involve aligning, based on the pose of AR presentation device 308 that has been determined, model asset 408 with the depiction of pre-modeled scene 318 within captured frame 418. Based on the depth data included in model asset 408 and the alignment of model asset 408, depth analysis 520 may be performed to generate a depth representation of pre-modeled scene 318. For example, the depth representation may include highly-accurate depth maps for objects that are part of pre-modeled scene 318, as well as more basic depth maps for other objects (e.g., objects 316) that may also be depicted in captured frame 418. These depth representations may be included or accounted for in augmentable representation 508 to allow rendering system 506 to perform occlusion, shading, reflection, and/or other rendering techniques that are dependent on precise depth data and/or spatial geometries of the real objects.

In the same or another illustrative implementation in which it is also assumed that AR presentation device 308 has captured and provided captured frame 418, it will be further assumed that model asset 408 includes data indicative of one or more physical properties that are to be exhibited by pre-modeled scene 318 for the augmented version of captured frame 418 (e.g., physical properties such as represented by physical property data 608). In this example, the generating of augmentable representation 508 by model application system 504 may again include pose analysis 518 (in which a pose of AR presentation device 308 is determined based on a depiction of pre-modeled scene 318 within captured frame 418 for the moment in time when AR presentation device 308 generated captured frame 418) to determine the pose of AR presentation device 308 with respect to pre-modeled scene 318. Again, as part of pose analysis 518, model application system 504 may align, based on the pose of AR presentation device 308 that has been determined, model asset 408 with the depiction of pre-modeled scene 318 within captured frame 418. Then, based on the data indicative of the physical properties and based on the alignment of model asset 408, physical property analysis 522 may be performed to generate a representation of pre-modeled scene 318 configured to exhibit the physical property indicated in the data. For example, this representation may indicate materials from which certain surfaces are to be virtually constructed (e.g., indicating that landscape feature 604 is a water feature rather than a desert, indicating that a particular structure 602 is to be presented with surfaces of stone rather than wood, etc.), and may also indicate other physical properties that are to be simulated such as whether a material is destructible or impervious to being altered (e.g., by fire, by bullets, etc.).

Along with indicating depth representations and/or physical properties for pre-modeled scene 318 as described in the examples above, the augmentable representation 508 generated by model application system 504 may further indicate certain virtual objects, virtual light sources, virtual portals, and/or other virtualized elements that are to be simulated for pre-modeled scene 318 in the ultimate augmented frame 420. For instance, while pre-modeled scene 318 may only include a configuration of basic structures, model asset 408 (and its application to captured frame 418 to generate augmentable representation 508) may provide detailed depth maps for the structures, physical properties associated with the structures, and additional virtual elements that do not correspond to any real aspect of the pre-modeled scene but that are nonetheless to be simulated together with the augmented depiction of the pre-modeled scene. As one example, a villager in the street between two structures 602 and who is carrying a torch serving as a virtual light source may be represented in augmentable representation 508 in a way that allows for virtual light from the torch to affect real and virtual objects depicted in augmented frame 420 and that also allows for real light in the physical world to affect the virtual villager.

Figure 8:
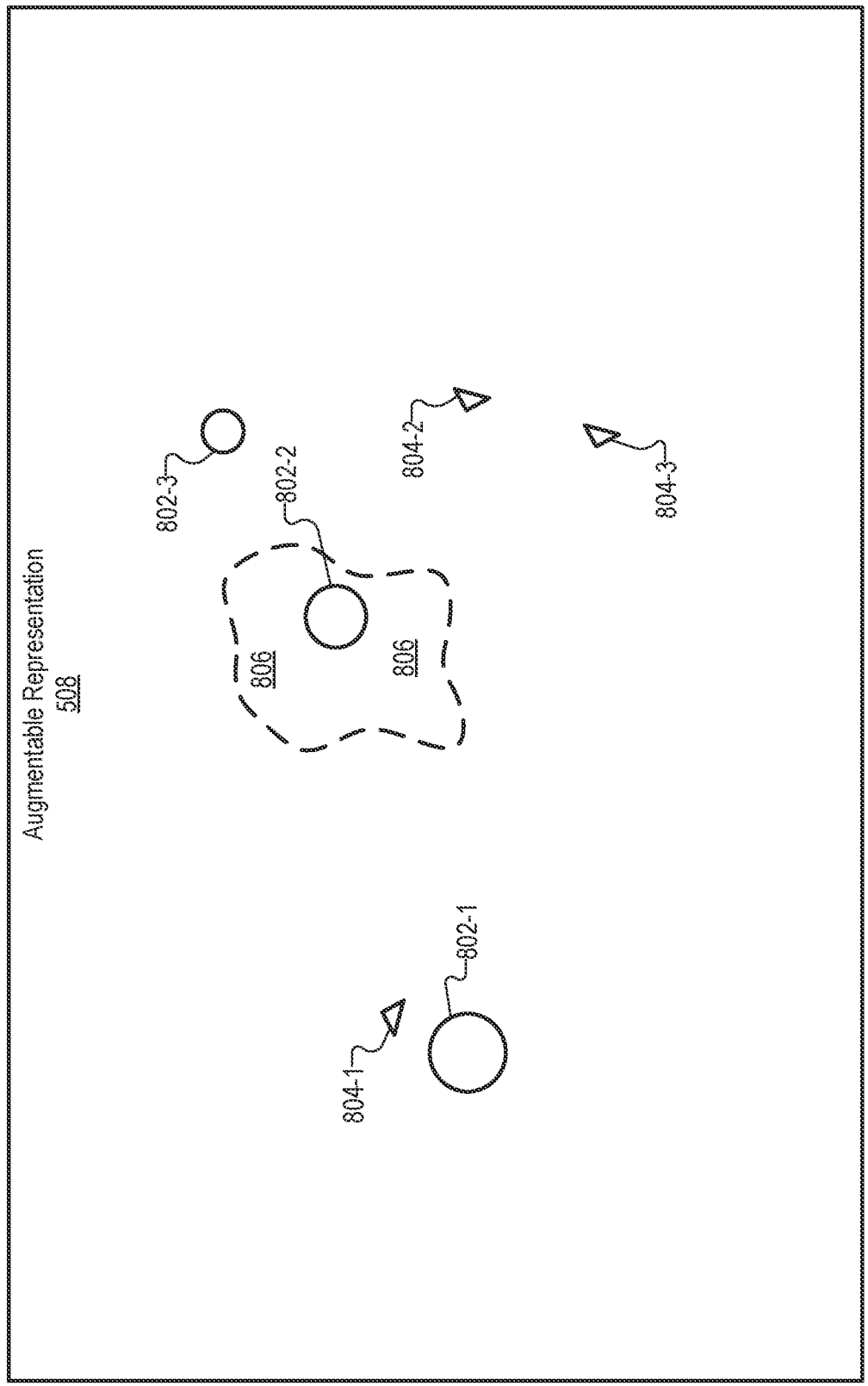
FIG. 8 shows an illustrative augmentable representation of the pre-modeled scene of FIG. 6A that is generated based on the captured frame of FIG. 7 according to embodiments described herein.

To illustrate, FIG. 8 shows example aspects of an implementation of augmentable representation 508 of pre-modeled scene 318 that is generated based on captured frame 418. More specifically, as shown, a plurality of virtual objects 802 (i.e., virtual objects 802-1 through 802-3) and a plurality of virtual light sources 804 (i.e., virtual light sources 804-1 through 804-3) are shown to be added to the scene, and a physical property 806 is shown to be assigned to landscape feature 604. It will be understood that other information not explicitly illustrated in this example may also be included as part of augmentable representation 508, such as high-precision (e.g., pre-scanned) depth maps for real objects that are part of pre-modeled scene 318, normal-precision (e.g., runtime-scanned) depth maps for real objects 316 that are depicted in captured frame 418 but not part of pre-modeled scene 318, other physical properties and/or objects that are to be simulated for the augmented version of the captured frame, and so forth.

Virtual objects 802 may represent any suitable objects as may serve a particular implementation. For instance, one of virtual objects 802 may be the villager character on the street mentioned above. As another example, virtual object 802-2 may represent a dragon flying over a pond implemented by physical property 806 (i.e., in an example where physical property 806 indicates that landscape feature 604 is to be simulated with a water surface). Virtual light sources 804 may represent different types of light sources such as flames (e.g., torches, campfires), street lights, lighted windows of structures 602, or other suitable sources of virtual light.

Returning to FIG. 5, model application system 504 is shown to provide augmentable representation 508 to rendering system 506 to allow for each of the different virtualized elements (e.g., virtual objects, virtual light sources, virtual surfaces and corresponding physical properties, etc.) to be simulated for the augmented frame by graphics processing operations referred to herein as render passes 510. In certain examples (not explicitly shown), a plurality of render passes may be performed sequentially, one following another. In this way, data from one render pass may be used for another render pass that is dependent thereon. In other examples, however (as shown in FIG. 5), the plurality of render passes 510 may include parallel render passes that are performed independently and concurrently (e.g., by different processors of rendering system 506).

For example, based on depth data and physical properties (e.g., location, brightness, etc.) of one particular virtual light source 804 represented in augmentable representation 508, one particular render pass 510 may perform raytracing operations to simulate how virtual light from that virtual light source 804 propagates to real and virtual objects depicted in the captured frame. At the same time (i.e., in parallel with this render pass 510), another render pass 510 may perform raytracing for a different virtual light source, another render pass 510 may perform raytracing for a real light source whose light may interact with virtual objects, another render pass 510 may simulate how a virtual or real object is to be reflected from the surface of a water feature or other reflective surface, another render pass 510 may implement a specular surface such as shimmering water of a pond, and so forth. In certain implementations (or for certain complex scenes having many different real and/or virtualized elements), a large number of render passes 510 implemented on a large number of parallel processors may all be performed concurrently. In this way, a very high-quality rendering may be performed in a relatively short period of time and/or with very low latency (e.g., so as to provide augmented frames in real time, as described above).

To illustrate a few examples of the types of render passes that may be included among render passes 510, FIGS. 9A-9C show illustrative aspects of potential render passes 510 (labeled as render passes 510-A through 510-C in FIGS. 9A-9C, respectively) that may be performed as part of generating an augmented version of captured frame 418 (i.e., augmented frame 420). It will be understood that render passes 510-A through 510-C are provided as examples of the types of render passes that may be performed, and that a large number and a wide variation of render passes may be included as may serve a particular implementation. As has been mentioned, render passes such as those illustrated in FIGS. 9A-9C may be performed in sequence (e.g., with at least some interdependencies between the results of one render pass and the processing of another render pass) or concurrently and independently (e.g., in parallel using separate processors, separate server devices, etc.).

FIG. 9A shows a first virtualized element simulated by a render pass 510-A included in the plurality of render passes 510. As shown, this particular virtualized element is a lighting effect associated with a virtual light source 804 included in augmentable representation 508 of pre-modeled scene 318 as the virtual light source 804 illuminates both a real object 316 and a virtual object 802 included in augmentable representation 508. The lighting effect is illustrated in FIG. 9A by light rays 902 originating from virtual light source 804 and by shadows 904 on the real object 316 and the virtual object 802 that arise from raytracing or other simulation of light rays 902. Just as certain parts of the surfaces of real object 316 and virtual object 802 are shown to be rendered with the darker shade of shadows 904 (e.g., due to these parts of the surfaces facing away from virtual light source 804 such that light rays 902 cannot directly reach them), it will be understood that other parts of the surfaces of real object 316 and/or virtual object 802 may be rendered as being especially bright as a result of being illuminated by light rays 902 of virtual light source 804. All of these lighting effects may be simulated and rendered in render pass 510-A in accordance with spatial geometry defined in the augmentable representation of the scene (e.g., based on depth data indicating how close the object surfaces are to the virtual light source, etc.), as well as with physical properties defined for virtual light source 804 (e.g., how bright the light source is, what color light rays 902 are, etc.) and/or the objects themselves (e.g., how reflective or diffuse the surfaces of virtual object 802 and/or real object 316 are, whether the surfaces have specular or other special properties that are to be accounted for, etc.).

While not explicitly illustrated in FIG. 9A, it will be understood that lighting effects for real light sources on virtual objects may be simulated and rendered in a similar way as FIG. 9A shows lighting effects being simulated and rendered for the virtual light source 804. Real-world physics will of course dictate the lighting effects of real light sources on real objects, but system 100 may be configured to simulate the lighting effects of real light sources on virtual objects such as virtual object 802. For example, a real light source may be identified and represented in augmentable representation 508 and its effects (e.g., illumination, shadows, etc.) may be determined for virtual objects 802 in the augmentable representation 508 in a similar way as illustrated for virtual light source 804 in FIG. 9A (e.g., by raytracing, etc.). Light maps and/or shadow maps for each virtual light source, real light source, virtual object, and/or real object may be generated and provided by independent render passes 510, by a combination of dependent render passes 510, by a single render pass 510, or in any other manner as may serve a particular implementation.

FIG. 9B shows additional virtualized elements simulated by a render pass 510-B included in the plurality of render passes 510 (or by separate render passes in certain implementations). As shown, one of these virtualized elements is a reflection 906 of a virtual object 802 in a reflective surface 806 of a water feature in the scene (referred to as reflective surface 806 since the reflective surface is defined in augmentable representation 508 by physical property 806 described above). For example, this virtual object 802 may represent a virtual dragon flying over the water feature in pre-modeled scene 318 and the reflection 906 of the virtual dragon may make the augmentation appear more realistic and lifelike than it otherwise would. As further shown, the other virtualized element shown in FIG. 9B is a reflection 906 of a real object 316 in reflective surface 806.

Both of these and/or other reflections on reflective surface 806 may be simulated and rendered in render pass 510-B in accordance with spatial geometry defined in augmentable representation 508 of the scene (e.g., based on depth data indicating how close the object surfaces are to reflective surface 806, etc.), as well as with physical properties defined for reflective surface 806 (e.g., how smooth or agitated the water surface is simulated to be, etc.) and/or the objects themselves. It will be understood that similar reflections may also be simulated for surfaces other than the glassy surface of a water feature. For example, clear reflections may be rendered on certain surfaces indicated to be mirrors in augmentable representation 508, dull or distorted reflections may be rendered on metallic surfaces with reflective but non-mirror-like physical properties in the augmentable representation, and so forth.

FIG. 9C shows yet another virtualized element simulated by a render pass 510-C included in the plurality of render passes 510. In this case, the virtualized element shown is a distributed specular effect 908 for a specular surface 806 of a water feature in the scene (referred to as specular surface 806 since the specular surface is defined in augmentable representation 508 by physical property 806 described above). As used herein, a specular surface is a surface that, due to microgeometry of the surface material (e.g., small crystals or other reflective normals distributed throughout the surface material), small specular points may be visible in a distributed and seemingly random way across the surface. For instance, a snowy field, a sheet of ice, a glittery portal, a slightly agitated body of water (e.g., a shimmering pond), and other such objects may have specular surfaces that randomly feature very small, bright reflections (manifesting as white, overexposed pixels) that appear and disappear in a probabilistic way.

As shown, distributed specular effect 908 on virtual specular surface 806 may include a distribution (e.g., a dynamic distribution that is randomly generated in accordance with a particular distribution model defined within augmentable representation 508) of specular pixels or small regions that reflect specular light in a manner replicating a real-world specular surface. This specular effect may be simulated and rendered in render pass 510-C in accordance with spatial geometry defined in augmentable representation 508 of the scene (e.g., based on depth data indicating how close the specular surface is to various real and/or virtual light sources, etc.), as well as with physical properties defined for specular surface 806 (e.g., what type of distribution of specular points is to be simulated, how large the specular points should be, etc.).

Returning to FIG. 5, data generated by each of render passes 510 is shown to be provided to and combined in image augmentation operations labeled in FIG. 5 as image augmentation 524. This data may be stored and transmitted in any suitable way. For example, it may be efficient and convenient to combine rendered data for each virtualized element onto an octahedral or other atlas structure that can store the graphical data generated by several rendered passes in a single atlas image.

At image augmentation 524, rendering system 506 may combine all the virtualized elements computed in the separate render passes 510 into a single rendered image that may be output as augmented frame 420. This combining may involve real-time histogram and tone mapping, color correction and blending, dynamic range compression and matching, per-pixel relighting, and so forth. Ultimately, the rendered augmentations are combined and composited onto captured frame 418 in a manner that creates the augmented version of captured frame 418 with additional virtual objects, lighting effects, reflections, specular and other special surfaces, and other virtualized elements that have been described. In this way, rather than merely seeing a plastic village on the table, a user may be presented with lifelike structures of stone, wood, and other materials; virtual villagers selling wares on the street; virtual dragons flying through the air (all while being properly occluded by real objects, reflected by virtual surfaces, casting shadows and being realistically lighted by real and virtual light sources, etc.); shimmering water features and other interesting surfaces; and so forth.

To illustrate, FIG. 10 shows one example of an augmented frame 420 that may ultimately be produced based on captured frame 418. As shown, the same objects of pre-modeled scene 318 (i.e., structures 602-1 through 602-3 and landscape feature 604) are depicted together with other real objects 316 similar to captured frame 418. However, various virtualized elements are added to make augmented frame 420 more interesting and immersive in various ways. For example, virtual objects 802-1 through 802-3 are added to pre-modeled scene 318, as well as virtual light sources 804-1 through 804-3. Lighting effects are shown to be rendered on virtual objects and real objects alike. For example, effects of light rays 902-1 of virtual light source 804-1 are shown to include shadows 904-1 rendered onto virtual object 802-1, while effects of light rays 902-3 of virtual light source 804-3 are shown to include shadows 904-3 rendered onto one of real objects 316. A reflection 906 of virtual object 802-2 (e.g., a flying dragon, a cloud, etc.) is shown to be rendered on the reflective surface 806 of a pond implementing landscape feature 604. The pond surface is also rendered as a specular surface, as illustrated by a specular effect 908. It will be understood that FIG. 10 shows only a few examples of virtualized elements that may augment captured frame 418 in the augmented version of the frame. In other examples, various other augmentations described herein or as may be known in the art may similarly be rendered using the off-device image frame rendering techniques described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 11:
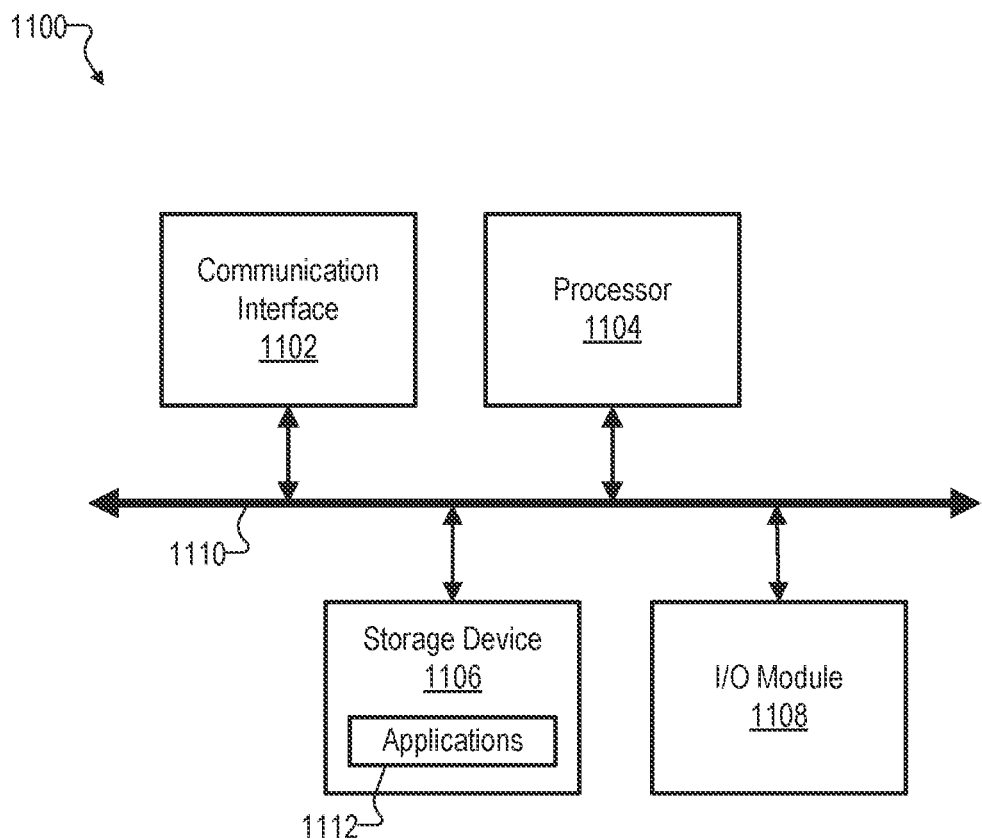
FIG. 11 shows an illustrative computing device that may implement image rendering systems and/or other systems and devices according to embodiments described herein.

FIG. 11 shows an illustrative computing device 1100 that may implement image rendering systems and/or other systems and devices described herein in accordance with principles described herein. For example, computing device 1100 may include or implement (or partially implement) an image rendering system such as system 100 or any component included therein or any system or device associated therewith (e.g., MEC system 302 and components thereof, cloud-based compute system 306 and components thereof, elements of network 304, AR presentation device 308, etc.).

As shown in FIG. 11, computing device 1100 may include a communication interface 1102, a processor 1104, a storage device 1106, and an input/output (I/O) module 1108 communicatively connected via a communication infrastructure 1110. While an illustrative computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may include one or more I/O modules configured to receive user input and provide user output. One or more I/O modules may be used to receive input for a single virtual experience. I/O module 1108 may include any hardware, firmware, software, or combination thereof supportive of input and output capabilities. For example, I/O module 1108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with processor 104 of system 100. Likewise, memory 102 of system 100 may be implemented by or within storage device 1106.

To the extent the aforementioned embodiments collect, store, and/or employ personal information of individuals, groups, or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information may be in an appropriately secure manner reflective of the type of information, for example, through various access control, encryption, and anonymization techniques for particularly sensitive information.

In the preceding specification, various example embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The specification and drawings are accordingly to be regarded in an illustrative rather than a restrictive sense.

What is claimed is:

1. A method comprising:
   detecting, by an image rendering system separate from and communicatively coupled to a presentation device, a pre-modeled scene within a captured frame received from the presentation device;
   identifying, by the image rendering system, the detected pre-modeled scene as a particular pre-modeled scene based on a set of requisite features associated with the particular pre-modeled scene;
   accessing, by the image rendering system from a data store accessible to the image rendering system and based on the identifying of the detected pre-modeled scene as the particular pre-modeled scene, a model asset associated with the particular pre-modeled scene;
   generating, by the image rendering system and based on the captured frame and the model asset, an augmentable representation of the particular pre-modeled scene;
   generating, by the image rendering system and based on the augmentable representation of the particular pre-modeled scene, an augmented version of the captured frame, the generating of the augmented version of the captured frame including a plurality of render passes each configured to simulate a different virtualized element of a plurality of virtualized elements augmenting the particular pre-modeled scene within the augmented version of the captured frame; and
   providing, by the image rendering system, the augmented version of the captured frame to the presentation device.

2. The method of claim 1, wherein:
   the presentation device captures the captured frame;
   the model asset includes depth data representing the particular pre-modeled scene; and
   the generating of the augmentable representation of the particular pre-modeled scene includes:
      determining, based on a depiction of the particular pre-modeled scene within the captured frame, a pose of the presentation device with respect to the particular pre-modeled scene when the presentation device captured the captured frame;
      aligning, based on the pose of the presentation device, the model asset with the depiction of the particular pre-modeled scene within the captured frame; and
      generating, based on the depth data and based on the alignment of the model asset, a depth representation of the particular pre-modeled scene.

3. The method of claim 1, wherein:
   the presentation device captures the captured frame;
   the model asset includes data indicative of a physical property that is to be exhibited by the particular pre-modeled scene for the augmented version of the captured frame; and the generating of the augmentable representation of the particular pre-modeled scene includes:
    determining, based on a depiction of the particular pre-modeled scene within the captured frame, a pose of the presentation device with respect to the particular pre-modeled scene when the presentation device captured the captured frame;
    aligning, based on the pose of the presentation device, the model asset with the depiction of the particular pre-modeled scene within the captured frame; and
    generating, based on the data indicative of the physical property and based on the alignment of the model asset, a representation of the particular pre-modeled scene configured to exhibit the physical property indicated in the data.

4. The method of claim 1, wherein:
the plurality of render passes includes parallel render passes that are performed independently and concurrently; and
the virtualized element simulated by a particular render pass in the plurality of render passes is a reflection of a virtual object in a reflective surface included in the augmentable representation of the particular pre-modeled scene.

5. The method of claim 1, wherein:
the plurality of render passes includes parallel render passes that are performed independently and concurrently; and
the virtualized element simulated by a particular render pass in the plurality of render passes is a reflection of a real object in a reflective surface included in the augmentable representation of the particular pre-modeled scene.

6. The method of claim 1, wherein:
the plurality of render passes includes parallel render passes that are performed independently and concurrently; and
the virtualized element simulated by a particular render pass in the plurality of render passes is a lighting effect associated with a virtual light source included in the augmentable representation of the particular pre-modeled scene as the virtual light source illuminates a real object.

7. The method of claim 1, wherein:
the plurality of render passes includes parallel render passes that are performed independently and concurrently; and
the virtualized element simulated by a particular render pass in the plurality of render passes is a lighting effect associated with a real light source illuminating a virtual object included in the augmentable representation of the particular pre-modeled scene.

8. The method of claim 1, wherein:
the plurality of render passes includes parallel render passes that are performed independently and concurrently; and
the virtualized element simulated by a particular render pass in the plurality of render passes is a distributed specular effect for a specular surface included in the augmentable representation of the particular pre-modeled scene.

9. The method of claim 1, wherein the detecting of the particular pre-modeled scene within the captured frame includes at least one of a feature matching operation, a feature recognition operation, or an object classification operation.

10. The method of claim 1, further comprising receiving, by the image rendering system, a request from the presentation device to provide AR content based on image content captured by the presentation device, the image content including the captured frame;
wherein the image rendering system receives the captured frame from the presentation device and performs the detecting of the particular pre-modeled scene, the generating of the augmentable representation, and the generating and providing of the augmented version of the captured frame in real time and in response to the request received from the presentation device.

11. A system comprising:
a memory storing instructions; and
one or more processors communicatively coupled to the memory and configured to execute the instructions to:
    detect a pre-modeled scene within a captured frame received from a presentation device;
    identify the detected pre-modeled scene as a particular pre-modeled scene based on a set of requisite features associated with the particular pre-modeled scene;
    access, from a data store accessible to the system and based on the identifying of the detected pre-modeled scene as the particular pre-modeled scene, a model asset associated with the particular pre-modeled scene;
    generate, based on the captured frame and the model asset, an augmentable representation of the particular pre-modeled scene;
    generate, based on the augmentable representation of the particular pre-modeled scene, an augmented version of the captured frame, the generating of the augmented version of the captured frame including a plurality of render passes each configured to simulate a different virtualized element of a plurality of virtualized elements augmenting the particular pre-modeled scene within the augmented version of the captured frame; and
    provide the augmented version of the captured frame to the presentation device.

12. The system of claim 11, implemented as a multi-access edge compute (MEC) system that includes:
a MEC gateway server configured to receive a request, from the presentation device, to provide AR content based on image content captured by the presentation device, the image content including the captured frame;
an asset server communicatively coupled to the MEC gateway server and to the data store, the asset server configured to perform the accessing of the model asset from the data store in response to direction from the MEC gateway server based on the request; and
an edge server communicatively coupled to the MEC gateway server and to the asset server, wherein, in response to additional direction from the MEC gateway server based on the request, the edge server is configured to:
    receive the captured frame from the presentation device,
    receive the model asset from the asset server, and
    perform the detecting of the particular pre-modeled scene, the generating of the augmentable representation, and the generating and providing of the augmented version of the captured frame.

13. The system of claim 11, wherein:
the presentation device captures the captured frame;
the model asset includes depth data representing the particular pre-modeled scene; and
the generating of the augmentable representation of the particular pre-modeled scene includes:
determining, based on a depiction of the particular pre-modeled scene within the captured frame, a pose of the particular pre-modeled scene with respect to the presentation device when the presentation device captured the captured frame;
aligning, based on the pose of the pre-modeled scene, the model asset with the depiction of the particular pre-modeled scene within the captured frame; and
generating, based on the depth data and based on the alignment of the model asset, a depth representation of the particular pre-modeled scene.

14. The system of claim 11, wherein:
the presentation device captures the captured frame;
the model asset includes data indicative of a physical property that is to be exhibited by the particular pre-modeled scene for the augmented version of the captured frame; and
the generating of the augmentable representation of the particular pre-modeled scene includes:
determining, based on a depiction of the particular pre-modeled scene within the captured frame, a pose of the presentation device with respect to the particular pre-modeled scene when the presentation device captured the captured frame;
aligning, based on the pose of the presentation device, the model asset with the depiction of the particular pre-modeled scene within the captured frame; and
generating, based on the data indicative of the physical property and based on the alignment of the model asset, a representation of the particular pre-modeled scene configured to exhibit the physical property indicated in the data.

15. The system of claim 11, wherein:
the plurality of render passes includes parallel render passes that are performed independently and concurrently; and
the virtualized element simulated by a particular render pass in the plurality of render passes is a reflection of a virtual object in a reflective surface included in the augmentable representation of the particular pre-modeled scene.

16. The system of claim 11, wherein:
the plurality of render passes includes parallel render passes that are performed independently and concurrently; and
the virtualized element simulated by a particular render pass in the plurality of render passes is a reflection of a real object in a reflective surface included in the augmentable representation of the particular pre-modeled scene.

17. The system of claim 11, wherein:
the plurality of render passes includes parallel render passes that are performed independently and concurrently; and
the virtualized element simulated by a particular render pass in the plurality of render passes is a lighting effect associated with a virtual light source included in the augmentable representation of the particular pre-modeled scene as the virtual light source illuminates a real object.

18. The system of claim 11, wherein:
the plurality of render passes includes parallel render passes that are performed independently and concurrently; and
the virtualized element simulated by a particular render pass in the plurality of render passes is a lighting effect associated with a real light source illuminating a virtual object included in the augmentable representation of the particular pre-modeled scene.

19. The system of claim 11, wherein:
the plurality of render passes includes parallel render passes that are performed independently and concurrently; and
the virtualized element simulated by a particular render pass in the plurality of render passes is a distributed specular effect for a specular surface included in the augmentable representation of the particular pre-modeled scene.

20. A non-transitory computer-readable medium storing instructions that, when executed, direct a processor of a computing device to:
detect a pre-modeled scene within a captured frame received from an augmented reality (AR) presentation device;
identify the detected pre-modeled scene as a particular pre-modeled scene based on a set of requisite features associated with the particular pre-modeled scene;
access, from a data store accessible to the computing device and based on the identifying of the detected pre-modeled scene as the particular pre-modeled scene, a model asset associated with the particular pre-modeled scene;
generate, based on the captured frame and the model asset, an augmentable representation of the particular pre-modeled scene;
generate, based on the augmentable representation of the particular pre-modeled scene, an augmented version of the captured frame, the generating of the augmented version of the captured frame including a plurality of render passes each configured to simulate a different virtualized element of a plurality of virtualized elements augmenting the particular pre-modeled scene within the augmented version of the captured frame; and
provide the augmented version of the captured frame to the presentation device.

\* \* \* \* \*